Oct. 10, 1950  A. E. DENTLER  2,524,893
SHOCK ABSORBER
Filed Aug. 25, 1945
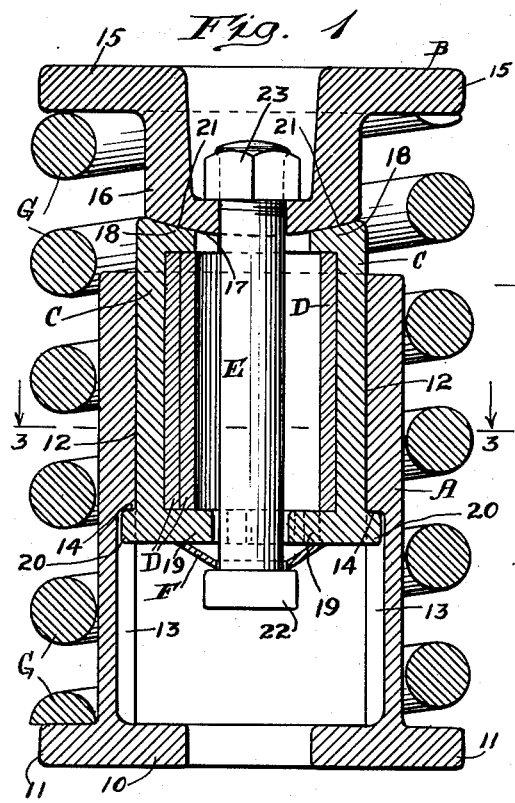
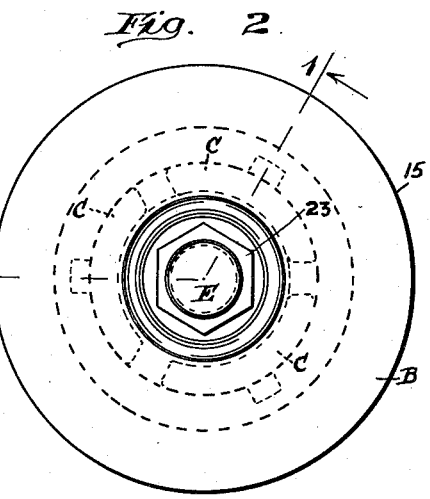
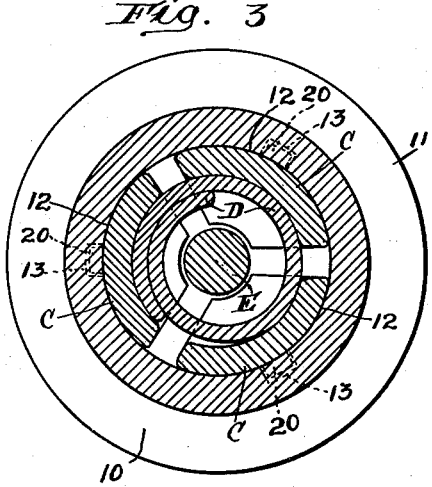
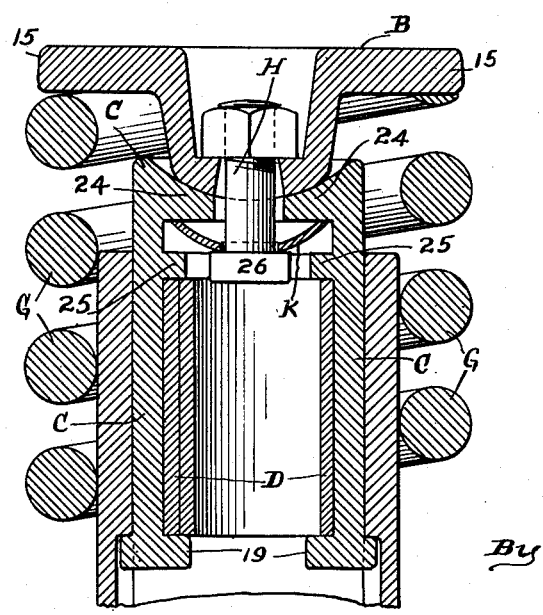
Inventor:
Arnold E. Dentler:
By Henry Fuchs.
Atty.

Patented Oct. 10, 1950

2,524,893

UNITED STATES PATENT OFFICE 2,524,893

SHOCK ABSORBER

Arnold E. Dentler, La Grange, Ill., assignor to W. H. Miner, Inc., Chicago, Ill., a corporation of Delaware Application August 25, 1945, Serial No. 612,673

4 Claims. (Cl. 267—9)

This invention relates to improvements in shock absorbers, especially adapted for use as snubbing devices in connection with truck springs of railway cars.

One object of the invention is to provide a friction shock absorber functioning as a snubbing device for truck springs of railway cars having substantially uniform resistance throughout the compression and expansion of the truck springs, wherein the uniform frictional resistance is produced by relative movement of a friction casing and friction shoes slidingly telescoped within the casing and held in frictional engagement with the casing by the expansive force of a normally contracted sleeve spring embraced by the shoes.

A more specific object of the invention is to provide a friction shock absorber of the character indicated adapted to be interposed between the top and bottom spring plates of a cluster of truck springs comprising a friction casing, a plurality of friction shoes telescoped within the casing in sliding frictional contact with the interior walls of the casing, a spring embraced by the shoes and urging the same against the casing walls, a follower member carrying the shoes, and a spring reacting between the follower member and casing for yieldingly resisting relative movement of the follower member and casing toward each other, wherein the casing bears on one of the spring plates of the cluster and the follower member bears on the other spring plate thereof and the follower member has a swiveled connection with the shoes to provide flexibility for automatic adjustment to compensate for any deviation from true parallelism of the contacting surfaces of the shock absorber and the spring plates of the spring cluster.

Other objects of the invention will more clearly appear from the description and claims hereinafter following.

In the drawing forming a part of this specification, Figure 1 is a vertical sectional view of my improved shock absorber, said view being taken on two intersecting planes at 120 degrees to each other and corresponding substantially to the line 1—1 of Figure 2. Figure 2 is a top plan view of Figure 1. Figure 3 is a horizontal sectional view, corresponding substantially to the line 3—3 of Figure 1. Figure 4 is a view, similar to Figure 1, with the bottom portion of the shock absorber broken away, illustrating another embodiment of the invention.

Referring first to the embodiment of the invention illustrated in Figures 1, 2, and 3, my improved shock absorber comprises broadly a casing A; a follower B; three friction shoes C—C—C; a sleeve spring D; a retainer bolt E; a spring washer F; and a main spring resistance G.

The casing A is in the form of a cylindrical, tubular member closed at the bottom end by a transverse wall 10. The wall 10 is extended laterally outwardly of the casing, thereby providing an annular spring abutment flange 11. At the upper or open end, the casing is provided with three longitudinally extending, interior friction surfaces 12—12—12 formed by the interior, cylindrical wall of the casing. At the inner end thereof, the interior wall of the casing is provided with three longitudinally extending slots or grooves 13—13—13, which are arranged symmetrically about the axis of the mechanism. The grooves or slots 13 are closed at the upper ends, thus providing three interior stop shoulders 14—14—14, which are in transverse alignment.

The follower B comprises a relatively heavy, platelike follower portion 15 of circular outline and a central boss 16 depending therefrom. The boss 16 is preferably hollow, as clearly shown in Figures 1 and 4. The underneath face or inner end of the boss 16 of the follower B is provided with a rounded surface 17 forming a ball face.

The shoes C are of similar design, each shoe being in the form of a transversely curved, heavy, platelike member, having inturned flanges 18 and 19 at the upper and lower ends thereof. As clearly shown in Figures 1 and 4, the flange 19 extends inwardly beyond the upper flange 18. At the inner end, each shoe is further provided with a lateral, outwardly projecting stop lug 20, which is engaged within the corresponding groove or slot 13 of the casing and limits outward movement of the shoe by engagement with the stop shoulder 14 at the upper end of said slot. The upper side of the flange 18 of each shoe C is concavely curved, thereby providing a bearing face 21 complementary to the ball face of the follower B. As will be evident, swiveling movement is provided by the ball face engagement between the follower B and the shoes C—C—C.

The sleeve spring D is in the form of a coiled spring plate of slightly more than one turn. The sleeve spring D is embraced between the shoes C—C—C, and in the assembled condition of the mechanism is under radial or lateral compression. The spring D is of such a height that it may be accommodated between the flanges 18 and 19 of the three shoes.

The retainer bolt E serves to yieldingly anchor the shoes C—C—C to the follower B. The bolt E is provided with a head 22 at its lower end and has a nut 23 threaded on the upper end thereof. The nut 23 of the bolt is disposed within the hollow boss 16 of the follower B and has shouldered engagement with the inner side of the bottom wall of the boss. The head 22 of the bolt is spaced beneath the flanges 19—19—19 of the shoes and the spring washer F, which is in the form of a dished plate interposed between the head 22 and the flanges 19—19—19.

The spring G, which surrounds the casing A, is in the form of a relatively heavy, helical coil and has its top and bottom ends bearing respectively on the platelike portion 15 of the follower B and the flange 11 of the casing.

My improved shock absorber replaces one of the coils of a truck spring cluster and is interposed between the top and bottom spring plates thereof. Although the improved shock absorber is preferably substituted for one of the coils of a spring cluster, it will be evident that more than one of the springs may be replaced by the same.

The operation of my improved snubber as shown in Figures 1, 2, and 3 is as follows: Upon the cluster of springs of the railway car truck being compressed between the spring follower plates of the truck springs, the follower B and casing A are moved toward each other, lengthwise of the mechanism, against the resistance of the spring G, and the friction shoes C—C—C are forced inwardly of the casing, sliding on the friction surfaces thereof, with which they are held in frictional contact by the expansive action of the spring sleeve D. Frictional resistance to relative movement of the shoes and casing is thus provided, snubbing the action of the truck springs. During recoil of the truck springs, the spring G returns the parts to the normal position shown in Figure 1, and the frictional resistance between the shoes and casing effectively snubs the recoil action. During both compression and releasing action of the shock absorber, the swiveling action between the follower B and shoes C—C—C provides sufficient flexibility for automatic adjustment of the parts so that the friction casing and follower will have true bearing engagement with the spring plates of the truck spring cluster at all times and prevent binding of the friction shoes and casing.

Referring next to the embodiment of the invention illustrated in Figure 4, the construction is the same as that shown in Figures 1 to 3 inclusive, with the exception that the friction shoes are anchored to the follower at their upper ends. The parts of the shock absorber in Figure 4, which are similar to those shown in Figures 1, 2, and 3, are indicated by the same reference characters as the corresponding parts in Figures 1, 2, and 3.

As shown in Figure 4, the shoes C—C—C are provided with relatively heavy, inturned flanges 24—24—24 at their upper ends and have inwardly projecting ribs 25 on the inner sides thereof below the flange 24 and spaced therefrom.

The spring sleeve D is seated between the ribs 25 and the bottom flanges 19 of the shoes.

The retainer bolt, which is indicated by H in Figure 4, is relatively short and a dished spring washer K is interposed between the lower sides of the flanges 24 of the shoes and the head 26 of the bolt.

The operation of the shock absorber shown in Figure 4 is substantially the same as that of the shock absorber hereinbefore described in connection with Figures 1, 2, and 3.

I claim:

1. In a friction shock absorber, the combination with a friction casing; of a plurality of friction shoes slidingly telescoped within the casing; a sleeve spring embraced between said shoes and pressing the same against the friction surfaces of the casing; a follower bearing on the outer ends of the shoes; a bolt anchoring the shoes to the follower, said bolt having shouldered engagement at one end with the follower, said bolt having a head at the other end; abutment means on said shoes; a spring interposed between the abutment of said shoes and said head, said follower and shoes having interengaged curved bearing faces to permit swiveling movement of the follower with respect to the shoes; and spring means reacting between said follower and casing yieldingly resisting relative movement of the same toward each other.

2. In a friction shock absorber, the combination with a friction casing; of a plurality of friction shoes slidingly telescoped within the casing; a sleeve spring embraced between said shoes and pressing the same against the friction surfaces of the casing; a follower bearing on the outer ends of the shoes; an anchoring bolt having shouldered engagement at one end with the follower and having a head at the other end; abutment means on said shoes; a dished spring washer interposed between the head of the bolt and the abutment on said shoes, said follower and shoes having interengaged curved bearing faces to permit swiveling movement of the follower with respect to the shoes; and spring means reacting between said follower and casing yieldingly resisting relative movement of the same toward each other.

3. In a friction shock absorber, the combination with a friction casing; of a plurality of friction shoes slidingly telescoped within the casing; laterally acting spring means embraced by said shoes and pressing the same against the friction surfaces of the casing; a follower bearing on the outer ends of said shoes, said follower having a convexly curved end face and said shoes having concavely curved end faces seated on said convex face to provide for swiveling movement between said follower and shoes; means for anchoring the shoes to the follower comprising a member having shouldered engagement at one end with the follower and headed at the other end; and yielding means between said head and shoes.

4. In a friction shock absorber, the combination with a friction casing; of a plurality of friction shoes slidingly telescoped within the casing, said shoes having inturned flanges at the outer and inner ends thereof; a follower bearing on the outer ends of the shoes; spring means embraced by said shoes for spreading the same apart, said spring means being confined between said inturned flanges; a retaining element for anchoring the shoes to the follower, said element having heads at opposite ends, one of said heads having shouldered engagement with the follower; and a yielding member reacting between the other head of said element and the flanges at the inner ends of said shoes.

ARNOLD E. DENTLER.

REFERENCES CITED

The following references are of record in the file of this patent:

UNITED STATES PATENTS

| Number | Name | Date |
|---|---|---|
| 1,990,638 | Davidson | Feb. 12, 1935 |
| 2,060,370 | Hall | Nov. 10, 1936 |
| 2,080,615 | Loewer | May 18, 1937 |
| 2,242,413 | Blattner | May 20, 1941 |
| 2,366,818 | Van Loan | Jan. 9, 1945 |
| 2,402,571 | Olander | June 25, 1946 |